(12) United States Patent
Fochtman

(10) Patent No.: US 6,405,947 B2
(45) Date of Patent: *Jun. 18, 2002

(54) GASEOUS FUEL INJECTOR HAVING LOW RESTRICTION SEAT FOR VALVE NEEDLE

(75) Inventor: James Paul Fochtman, Williamsburg, VA (US)

(73) Assignee: Siemens Automotive Corporation, Auburn Hills, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/370,850
(22) Filed: Aug. 10, 1999
(51) Int. Cl.[7] ................................................ B05B 1/30
(52) U.S. Cl. ............................ 239/585.4; 251/129.21
(58) Field of Search .................. 239/585.1–585.5, 239/533.2–533.12, 88–92, 5; 251/129.21, 129.18, 129.15

(56) References Cited

U.S. PATENT DOCUMENTS

| | | | |
|---|---|---|---|
| 2,291,968 A | 8/1942 | Keefe | 175/336 |
| 3,662,987 A | 5/1972 | Schlagmuller et al. | 251/139 |
| 3,731,881 A | 5/1973 | Dixon et al. | 239/585 |
| 3,937,855 A | 2/1976 | Gruenwald | |
| 4,331,317 A | 5/1982 | Kamai et al. | |
| 4,586,017 A | 4/1986 | Laskaris et al. | |
| 4,634,055 A | 1/1987 | Hans et al. | |
| 4,662,567 A * | 5/1987 | Knapp | 239/585.1 |
| 4,688,723 A | 8/1987 | Kern et al. | 239/391 |
| 4,693,227 A | 9/1987 | Satou | 123/575 |
| 4,783,009 A | 11/1988 | Coates | 239/580 |
| 4,909,447 A | 3/1990 | Gallup et al. | 239/585 |
| 4,922,862 A | 5/1990 | Casacci | 123/1 A |

(List continued on next page.)

FOREIGN PATENT DOCUMENTS

| | | |
|---|---|---|
| DE | 19638201 A | 9/1996 |
| EP | 0 661 444 A1 | 7/1995 |
| EP | 1 055 811 A2 | 11/2000 |
| GB | 2 044 986 | 10/1980 |
| WO | WO 99/27247 | 6/1999 |
| WO | WO 99/61781 | 12/1999 |

OTHER PUBLICATIONS

European Search Report; PCT/US98/24144; Mar. 1999; 3 pages.

*Primary Examiner*—Andres Kashnikow
*Assistant Examiner*—Dinh Q. Nguyen

(57) ABSTRACT

An electromagnetically operable fuel injector for a gaseous fuel injection system of an internal combustion engine, the injector having a generally longitudinal axis. which comprises, a ferromagnetic core, a magnetic coil at least partially surrounding the ferromagnetic core and an armature magnetically coupled to the magnetic coil and being movably responsive to the magnetic coil. The armature actuates a valve closing element which interacts with a fixed valve seat of a fuel valve and is movable away from the fixed valve seat when the magnetic coil is excited. The fixed valve seat defines a central fuel opening and a generally annular groove adjacent the central fuel opening, the armature having a generally elongated shape and a generally central opening for axial reception and passage of gaseous fuel from a fuel inlet connector positioned adjacent thereto. The fuel inlet connector and the armature are adapted to permit a first flow path of gaseous fuel between the armature and the magnetic coil as part of a path leading to said fuel valve. A method of directing gaseous fuel through an electromagnetically operable fuel injector for a fuel system of an ? combustion engine is also disclosed.

27 Claims, 6 Drawing Sheets

U.S. PATENT DOCUMENTS

| | | | |
|---|---|---|---|
| 4,946,107 A | 8/1990 | Hunt | 239/585 |
| 4,978,074 A | 12/1990 | Weinand | 239/585 |
| 4,984,744 A | 1/1991 | Babitzka | |
| 4,988,967 A | 1/1991 | Miller et al. | 335/279 |
| 5,025,554 A | 6/1991 | Dohi | 29/860 |
| 5,033,716 A * | 7/1991 | Messenich | 239/585.1 |
| 5,035,360 A | 7/1991 | Green et al. | 239/585 |
| 5,046,472 A | 9/1991 | Linder | 123/533 |
| 5,092,305 A | 3/1992 | King | 123/575 |
| 5,127,585 A | 7/1992 | Mesenich | 239/585.5 |
| 5,129,381 A | 7/1992 | Nakajima | 123/531 |
| 5,131,599 A | 7/1992 | Maier | |
| 5,174,505 A | 12/1992 | Shen | 239/417.3 |
| 5,209,408 A | 5/1993 | Reiter | |
| 5,232,167 A | 8/1993 | McCormick et al. | |
| 5,301,874 A | 4/1994 | Vogt et al. | |
| 5,341,994 A | 8/1994 | Wakeman | 239/585.5 |
| 5,344,081 A | 9/1994 | Wakeman | |
| 5,373,992 A | 12/1994 | Reiter | |
| 5,381,966 A | 1/1995 | Gernert et al. | 239/585.3 |
| 5,383,606 A | 1/1995 | Stegmaier et al. | |
| 5,392,995 A | 2/1995 | Wahba | |
| 5,494,223 A | 2/1996 | Hall et al. | 239/585.5 |
| 5,494,224 A | 2/1996 | Hall et al. | 239/585.5 |
| 5,529,387 A | 6/1996 | Mialkowski | |
| 5,544,816 A | 8/1996 | Nally et al. | |
| 5,566,920 A | 10/1996 | Romann et al. | 251/129.21 |
| 5,609,304 A | 3/1997 | Sasao | 239/585.4 |
| 5,613,640 A | 3/1997 | Furuya et al. | 239/585.5 |
| 5,628,294 A | 5/1997 | Krieckaert et al. | 123/525 |
| 5,632,467 A | 5/1997 | Just et al. | 251/129.21 |
| 5,678,767 A | 10/1997 | Rahbar | 239/533.2 |
| 5,687,698 A | 11/1997 | Mastro et al. | |
| 5,704,553 A | 1/1998 | WieczoreK et al. | 239/585.1 |
| 5,730,367 A | 3/1998 | Pace et al. | 239/408 |
| 5,735,253 A | 4/1998 | Perotto et al. | 173/575 |
| 5,755,211 A | 5/1998 | Koch | |
| 5,758,865 A | 6/1998 | Casey | |
| 5,785,251 A | 7/1998 | Wood et al. | 239/417.3 |
| 5,794,860 A | 8/1998 | Neumann | 239/585.5 |
| 5,806,473 A | 9/1998 | Kometani et al. | |
| 5,860,601 A | 1/1999 | Egizi | 239/533.12 |
| 5,915,626 A | 6/1999 | Awarzamani et al. | |
| 5,918,818 A | 7/1999 | Takeda | |
| 5,921,475 A | 7/1999 | De Vries et al. | 239/585.4 |
| 5,927,613 A | 7/1999 | KoyanagI et al. | 239/585.1 |
| 5,931,391 A | 8/1999 | Tani et al. | |
| 5,996,911 A | 12/1999 | Gesk et al. | |
| 5,996,912 A * | 12/1999 | Ren et al. | 239/585.5 |
| 6,000,628 A * | 12/1999 | Lorraine | 239/585.1 |
| 6,003,791 A * | 12/1999 | Reiter | 239/585.5 |
| 6,027,050 A * | 2/2000 | Rembold et al. | 239/585.5 |
| 6,032,879 A | 3/2000 | Hamada et al. | |
| 6,076,802 A | 6/2000 | Maier | |
| 6,079,642 A | 6/2000 | Maier | |
| 6,089,467 A | 7/2000 | Fochtman et al. | |
| 6,102,303 A | 8/2000 | Bright et al. | |

* cited by examiner

FIG. 5
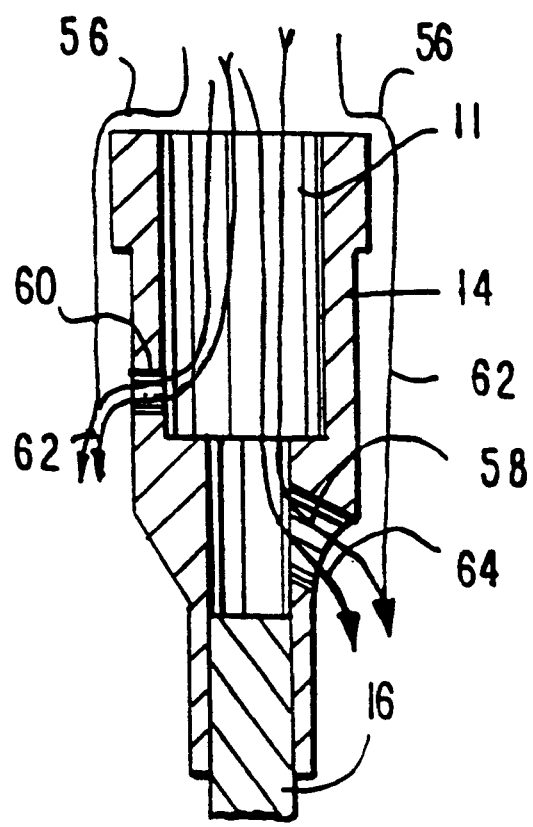
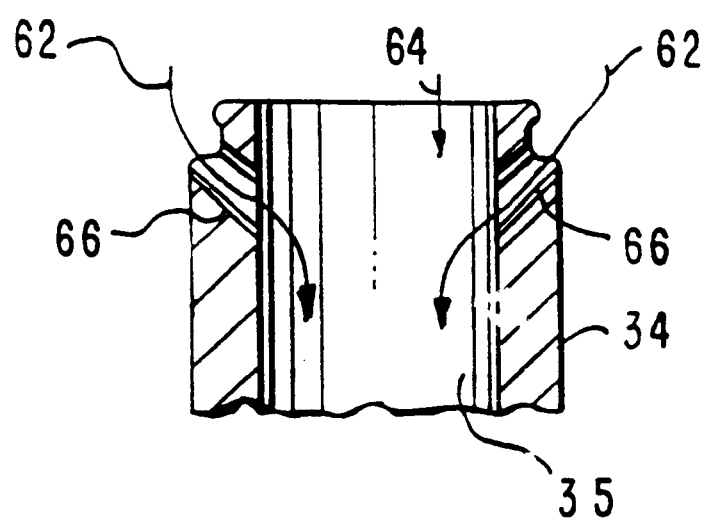
FIG. 6

GASEOUS FUEL INJECTOR HAVING LOW RESTRICTION SEAT FOR VALVE NEEDLE

BACKGROUND OF THE INVENTION

1. Field of the Invention

The present application relates to a compressed natural gas injector which incorporates an improved low restriction valve needle seat to control the fuel flow in the needle valve seat area.

2. Description of the Related Art

Compressed natural gas (hereinafter sometimes referred to as "CNG") is becoming a common automotive fuel for commercial fleet vehicles and residential customers. In vehicles, the CNG is delivered to the engine in precise amounts through gas injectors, hereinafter referred to as "CNG injectors". The CNG injector is required to deliver a precise amount of fuel per injection pulse and maintain this accuracy over the life of the injector. In order to maintain this level of performance for a CNG injector, certain strategies are required to help reduce the effects of contaminants in the fuel and to control the flow of fuel through the injector.

Compressed natural gas is delivered throughout the country in a pipeline system and is mainly used for commercial and residential heating. While the heating systems can tolerate varying levels of quality and contaminants in the CNG, the tolerance levels in automotive gas injectors is significantly lower. Accordingly, utilizing CNG in engines presents problems unique to CNG as well as to the contaminant levels.

These contaminants, which have been acceptable for many years in CNG used for heating affect the performance of the injectors to varying levels and will need to be considered in future CNG injector designs. Some of the contaminants found in CNG are small solid particles, water, and compressor oil. Each of these contaminants needs to be addressed in the injector design for the performance to be maintained over the life of the injector.

The contaminants can enter the pipeline from several sources. Repair, maintenance and new construction to the pipeline system can introduce many foreign particles into the fuel. Water, dust, humidity and dirt can be introduced in small quantities with ease during any of these operations. Oxides of many of the metal types found in the pipeline can also be introduced into the system. In addition, faulty compressors can introduce vaporized compressor oils which blow by the seals of the compressor and enter into the gas. Even refueling can force contaminants on either of the refueling fittings into the storage cylinder. Many of these contaminants are likely to reach vital fuel system components and alter the performance characteristics over the life of the vehicle.

In general, fuel injectors require extremely tight tolerances on many of the internal components to accurately meter the fuel. For CNG injectors to operate on CNG while remaining contaminant tolerant, the guide and impact surfaces for the armature needle assembly require certain specifically unique characteristics.

The CNG injector is required to accurately inject metered pulses of fuel over the life of the injector. It is also necessary to be able to calibrate the injector to a specific calibration. Before it is possible to calibrate a CNG injector, the design must have solved many of the specific problems inherent in using CNG, including higher fuel pressures and needle lift when compared to a standard gasoline injector, choked sonic flow, and pressure losses through the injector. For proper calibration of the injector, the two most important parameters which require control are pressure upstream of the choked flow, and orifice size.

In addition, to problems of contaminants in gaseous fuels, other problems relating to flow conditions and pressure losses must also be addressed. For example. whereas in a standard gasoline injector orifice size is a parameter that is controlled to extremely tight tolerances, pressure loss is a CNG, or other gaseous fuel, specific problem which must be considered in the overall design when using gaseous fuels in such injectors. Nevertheless, pressure loss is a natural phenomenon which occurs as fluid flows through any system. As the velocity of the fluid is increased and the fluid is forced through tortuous paths the losses can become quite substantial over the length of the path. These losses contribute directly to the loss of overall mass flow available from the injector. Without proper control of the high pressure loss areas in the injector, static flows would be nearly impossible to correlate.

The CNG injector generally has sonic flow exiting the injector. This occurs with CNG any time there is a 55% pressure differential across any given point in the system. While sonic choked flow is achieved, the downstream pressure is no longer included in the mass flow function. The only variables which contribute to the theoretical mass flow in a choked flow system are gas constants, upstream pressure, upstream temperature, and flow area. The gas constants for any given fuel passing through the injector from the fuel rail will be constant from injector to injector, and at present the area for the orifice is controlled very closely for gasoline applications. This leaves pressure and temperature as potential variables. The fuel temperature will not vary significantly from injector to injector due to the short time available for heat transfer. However, the pressure above the orifice is affected by all of the losses throughout the injector and may vary between injectors.

As the fuel flows from the fuel rail through the injector, each item comprising the flow path contributes to the total loss in pressure. Some of these losses are small and some are quite substantial. In the present CNG injector art, the main fuel path consists of the filter, upper inlet connector, adjusting tube, armature, valve body, lower guide, lower guide/ seat masked area, needle/seat interface and lastly, the orifice.

The filter, upper inlet connector, adjusting tube, lower guide and valve body account for a very small portion of the overall pressure loss in the injector. The armature has a small intentional loss to allow for faster breakaway and dampening during opening impact of the valve needle. This leaves only the lower guide/seat interface and the needle/seat interface as the main controllable limiting factors for controlling pressure losses.

Theoretically, the needle/seat interface can be controlled through seat angle, spherical needle radius and lift. An increase in lift would reduce the magnetic force of the solenoid coil and lengthen the opening time and linearity of the injector. As the spherical radius of the needle increases, it thereby increases the exposed area for a given lift with the result that the net force of the gas pressure increases. This also lengthens the opening time of the injector. Presently such injectors utilize a needle/seat angle of approximately 90°. If the seat angle is increased from the present 90° angle, the flow area exposed for a given lift also increases as long as the needle spherical radius is changed to accommodate the reduced sealing diameter. This concept, although appearing relatively simple, has several serious drawbacks.

When the seat angle is increased, two problems occur. The first problem is that the increased seat angle is more difficult to grind on existing seat grinding equipment. A good compromise between grinding capabilities and design can be reached to reduce the effect of this problem. The second problem is that the flow past the lower needle guide/seat interface becomes pinched and the flow loss from this interface becomes significant. The present invention provides significant flow control while avoiding the loss of fuel flow through a novel valve structure which incorporates a novel valve needle seat.

SUMMARY OF THE INVENTION

An electromagnetically operable fuel injector for a gaseous fuel injection system of an internal combustion engine is disclosed, the injector having a generally longitudinal axis, which comprises, a ferromagnetic core, a magnetic coil at least partially surrounding the ferromagnetic core, an armature magnetically coupled to the magnetic coil and being movably responsive to the magnetic coil, the armature actuating a valve closing element which interacts with a fixed valve seat of a fuel valve and being movable away from the fixed valve seat when the magnetic coil is excited. The fixed valve seat of the fuel valve defines a central fuel opening and a generally annular groove adjacent the central fuel opening, the armature having a generally elongated shape and a generally central opening for axial reception and passage of gaseous fuel from a fuel inlet connector positioned adjacent thereto. The fuel inlet connector and the armature are adapted to permit a first flow path of gaseous fuel between the armature and the magnetic coil as part of a path leading to the fuel valve.

In a preferred embodiment an electromagnetically operable fuel injector for a compressed natural gas fuel injection system of an internal combustion engine is disclosed, the injector having a generally longitudinal axis, which comprises, a ferromagnetic core, a magnetic coil at least partially surrounding the ferromagnetic core, an armature magnetically coupled to the magnetic coil and movably responsive to the magnetic coil, the armature having a first upper end face and a lower end portion. A valve closing element is connected to the lower end portion of the armature and is interactive with a fuel valve having a fixed valve seat to selectively permit fuel to pass through the valve seat as the valve closing element is moved to a valve open position by the armature. The fixed valve seat has a generally frusto-conically shaped portion surrounded by an adjacent circular shaped annular groove to reduce the pressure differential occurring across the valve closing element and the fixed valve seat upon closing the fuel valve. A fuel inlet connector extends in a generally longitudinal direction above the armature and defines a path for fuel to enter the inlet connector and to be directed toward the armature, the fuel inlet connector having a lowermost end portion having a lowermost surface spaced above the armature to define a working gap through which the armature is movable. The armature has a fuel reception portion for receiving fuel directed from the fuel inlet connector, and further defines a generally axial fuel passage.

A method of directing gaseous fuel through an electromagnetically operable fuel injector for a fuel system of an internal combustion engine is also disclosed, the injector having a generally longitudinal axis, and including a fuel inlet end portion and a fuel outlet end portion. A fuel inlet connector is positioned at the fuel inlet end portion and has a fuel inlet end portion and a fuel outlet end portion. An armature is positioned adjacent the fuel outlet end portion of the fuel inlet connector, the armature being spaced from the fuel inlet connector to define a working gap to permit movement of the armature toward and away from the fuel inlet connector to selectively open and close a fuel valve by providing upward and downward movement of a valve closing element to selectively permit gaseous fuel to pass therethrough to an air intake manifold. The method comprises directing the gaseous fuel to pass axially through the fuel inlet connector, directing the gaseous fuel to pass from the fuel inlet connector to the generally elongated central opening of the armature in an axial direction toward the fuel valve, and providing an annular groove adjacent the fixed valve seat for reception of fuel so as to reduce pressure losses across the fuel valve during closure thereof. In particular, the fuel is permitted to enter in volumetric space adjacent the fuel valve to reduce the pressure losses thereacross during closure of the fuel valve.

BRIEF DESCRIPTION OF THE DRAWINGS

Preferred embodiments of the invention are described hereinbelow with reference to the drawings wherein:

FIG. 5 is an elevational cross-sectional view of a preferred embodiment of the armature shown in FIGS. 1 and 2 and illustrating the improved fuel flow paths resulting therefrom;

FIG. 6 is an elevational cross-sectional view of the upper portion of a preferred embodiment of the valve body shown in FIGS. 1 and 2;

DESCRIPTION OF THE PREFERRED EMBODIMENTS

Figure 1:
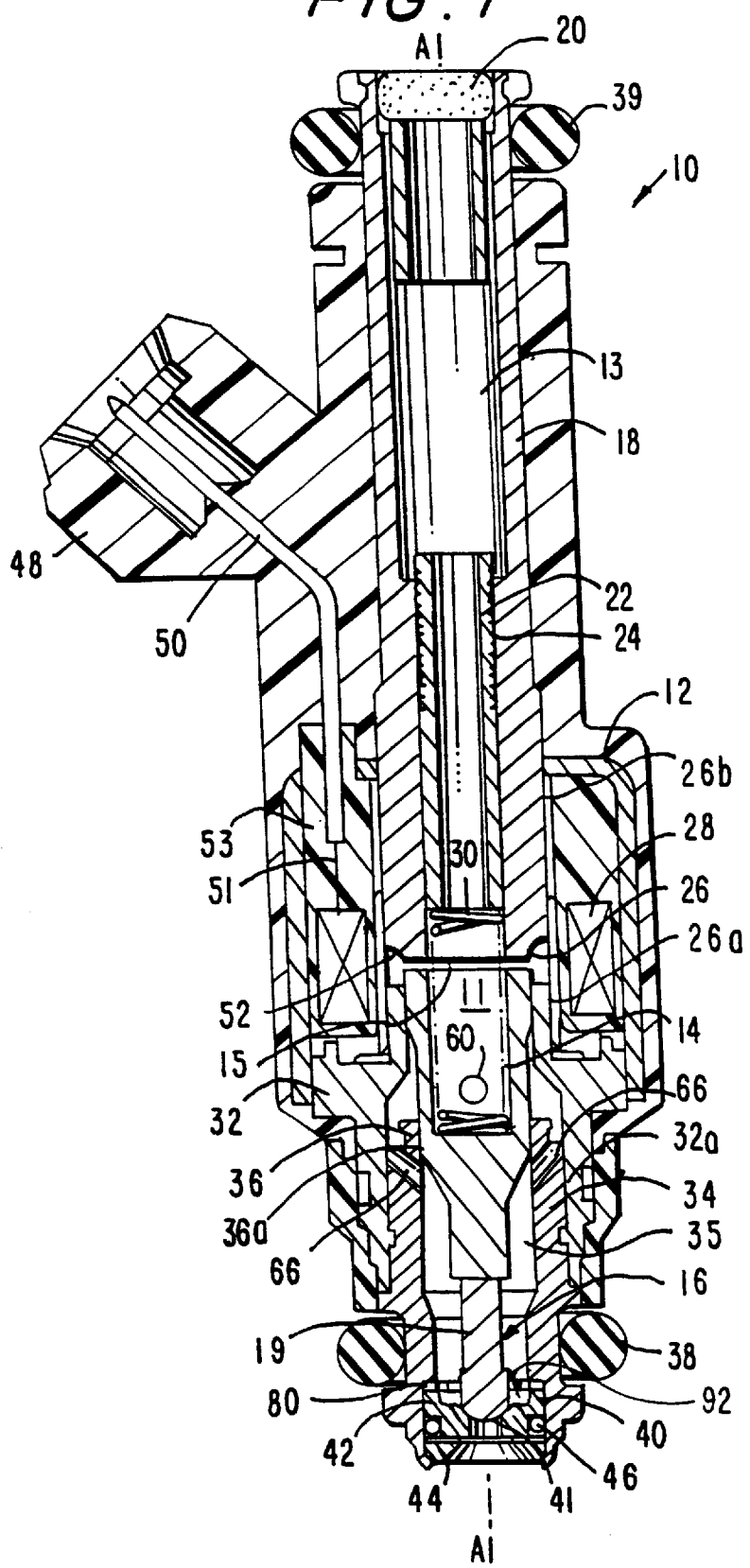
FIG. 1 is an elevational view, partially in cross-section, of a preferred embodiment of a compressed natural gas injector incorporating a valve needle seat constructed according to the invention.

Referring initially to FIG. 1 there is shown a CNG injector which is constructed according to the present invention. Injectors of the type contemplated herein are described in commonly assigned U.S. Pat. No. 5,494,224, the disclosure of which is incorporated by reference herein. Injectors of this type are also disclosed in commonly assigned copending applications; U.S. application Ser. No. 09/320,178, filed May 26, 1999, entitled Contaminant Tolerant Compressed Natural Gas Injector and Method of Directing Gaseous Fuel Therethrough, and U.S. application Ser. No. 09/320,176, filed May 26, 1999, entitled Compressed Natural Gas Injector Having Improved Low Noise Valve Needle, the disclosures of which are incorporated herein by reference. Other commonly assigned, copending applications include U.S. application Ser. No. 09/320,177, filed May 26, 1999, entitled Compressed Natural Gas Injector with Gaseous Damping for Armature Needle Assembly During Opening, U.S. application Ser. No. 09/320,175, filed May 26, 1999, entitled Gaseous Injector with Columnated Jet Orifice Flow Directing Device and U.S. application Ser. No. 09/320,179, filed May 26, 1999, entitled Compressed Natural Gas Injector Having Magnetic Pole Face Flux Director, the disclosures of which are also incorporated herein by reference.

The injector 10 includes housing 12 containing armature 14 to which valve needle 16 is attached by crimping in a known manner. Fuel inlet connector 18 includes central fuel flow opening 13 and CNG filter 20 at the upper end portion of opening 13 as shown. The fuel inlet connector 18 also includes adjusting tube 22 connected thereto at 24 by a known crimping procedure. Housing 12 includes inner non-magnetic shell 26 which surrounds the inlet connector 18 and armature 14 having central fuel flow opening 11 as shown. Armature 14 and fuel inlet connector 18 define with housing 12, an enclosure for solenoid coil 28 which is selectively energized to move armature 14 and needle 16 upwardly to open the valve aperture 41, and selectively deenergized to permit armature 14 and needle 16 to return to the "closed valve" position as shown, under the force of coil spring 30. Fuel flow into the injector begins at filter 20 and passes through fuel inlet connector 18, to armature 14, and ultimately to valve aperture 41 of valve seat 40 into the intake manifold of the engine (not shown).

Figure 2:
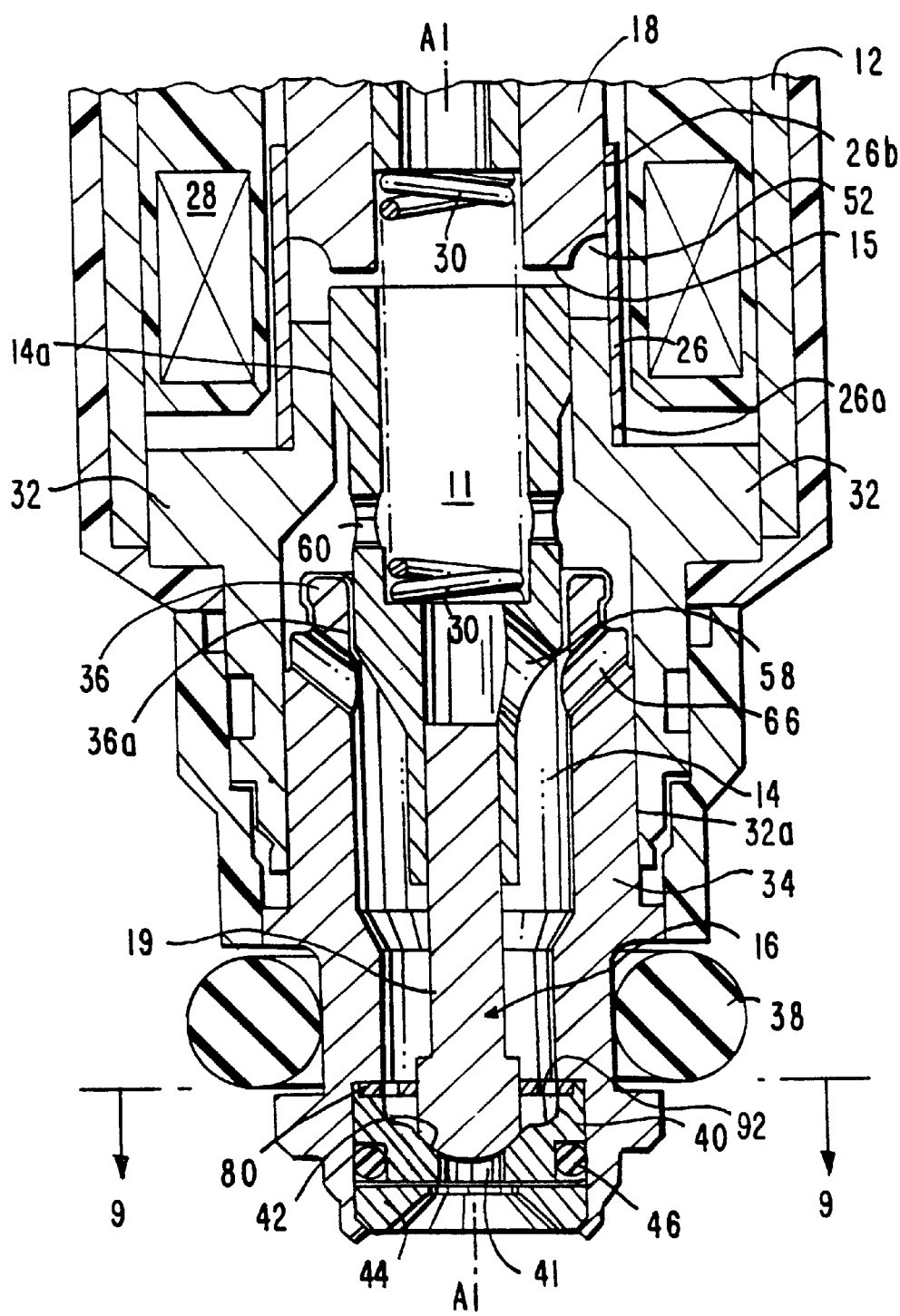
FIG. 2 is an enlarged elevational cross-sectional view of the lower portion of the injector of FIG. 1, showing an enlarged view of the valve needle seat shown in FIG. 1.

Referring further to FIG. 1 in conjunction with FIG. 2, valve body shell 32, which is made of a ferromagnetic material and which forms part of a magnetic circuit, surrounds valve body 34 and has at the upper end, upper guide 36 as shown. Space 36a between upper guide 36 and armature 14 is about 0.010 to about 0.015 mm on the diameter, and permits guiding movement of armature 14. Lower O-rings 38 provide sealing between the injector 10 and the engine intake manifold (not shown) and upper O-rings 39 provide sealing between the injector 10 and the fuel rail (also not shown). Valve body 34 defines central fuel flow opening 35.

In FIG. 2, valve body shell 32 is attached to valve body 34, preferably by weld 32a, and at the upper end by weld 26a, to non-magnetic shell 26. Non-magnetic shell 26 is in turn welded to fuel inlet connector at 26b. Thus, fuel flowing from fuel inlet connector 18 across working gap 15 must flow through the clearance space 14a between armature 14 and valve body shell 32 which is also provided to permit upward and downward movement of armature 14. The space 14a is approximately 0.10 to 0.30 mm on the diameter.

Referring again to FIGS. 1 and 2, valve seat 40 contains a valve orifice 41 and a funnel shaped needle rest 42 having a frusto-conical cross-sectional shape. The valve seat 40 is maintained in position by back-up washer 44 and sealed against fuel leakage with valve body 34 by O-ring 46. Overmold 48 of suitable plastic material such as nylon supports terminal 50 which extends into coil 28 and is connected via connection 51 to provide selective energization of the coil to open the valve by raising the armature 14 and valve needle 16 against the force of spring 30. Armature upward and downward movement is permitted by interface space 15 (or working gap) between the inlet connector 18 and the armature 14. The working gap is generally extremely small i.e. in the order of about 0.3 mm (millimeters). Solenoid coil 28 is surrounded by dielectric plastic material 53 as shown in the FIGS.

In injectors of this type, the interface space 15 (or working gap 15) between the inlet connector and the armature is extremely small, i.e. in the order of about 0.3 mm (millimeters), and functions relatively satisfactorily with conventional fuels which are relatively free of contaminants such as water, solids, oil, or the like, particularly after passing through a suitable fuel filter. Accordingly, when the two surfaces surrounding space 15 are in such intimate contact that the atmosphere between them is actually displaced in relatively significant amounts, atmospheric pressures acting on the two members actually force the two surfaces together. Any liquid contaminant present at the armature/inlet connector interface would allow for the atmosphere to be displaced, thereby adversely affecting the full and free operation of the armature/needle combination.

When known injectors, which functioned at relatively acceptable levels with relatively clean conventional fuels, were utilized with CNG, impurities such as oil or water at the inlet connector/armature interface produced a force of about 16.5 Newtons holding the armature to the inlet connector. In comparison, the force provided by spring 30 is in the order of about 3 Newtons, thus fully explaining the erratic closing of the armature/valve needle when the fuel utilized with known injectors is CNG. In particular, the 16.5 Newton force holding the inlet connector and armature together is due to the fact that the fuel operating pressure within the injector is about 8 bar (i.e. 8 atmospheres) and this force of about 16.5 Newtons acts across the lower surface area of the inlet connector 18, which is about 21 square millimeters (i.e. $mm^2$). Thus a relatively minor slick of oil or other impurity within space 15 of a known injector will cause the inlet connector and the armature to become temporarily attached to each other, particularly due to the 8 bar pressure acting on the remaining surfaces of the inlet connector and armature. As noted, the tendency for the armature to become attached to the inlet connector results in erratic valve closing.

Figure 3:
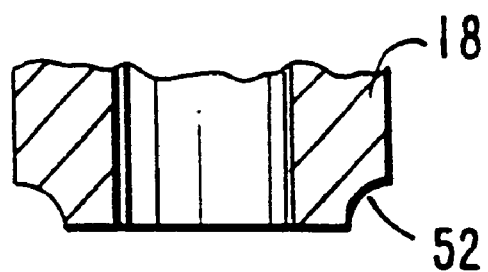
FIG. 3 is a partial elevational cross-sectional view of the lower end portion of the fuel inlet connector of the injector shown in FIGS. 1 and 2.

The present injector eliminates the aforementioned erratic valve closing and improve the operation of the injector with gaseous fuels. In FIG. 3, the lower end portion of inlet connector 18 is configured as shown by the arcuately chamfered end 52. This configuration provides a beneficial effect in that it directs and orients the magnetic field across the working gap 15 in a manner which optimizes the useful magnetic force created for moving the armature through the working gap. This feature is disclosed in commonly assigned application entitled Compressed Natural Gas Fuel Injector Having Magnetic Pole Face Flux Director, the disclosure of which is incorporated herein by reference. Additional related features are also disclosed in the aforementioned commonly assigned copending application entitled Compressed Natural Gas Injector Having Gaseous Dampening For Armature Needle Assembly During Opening.

Figure 4:
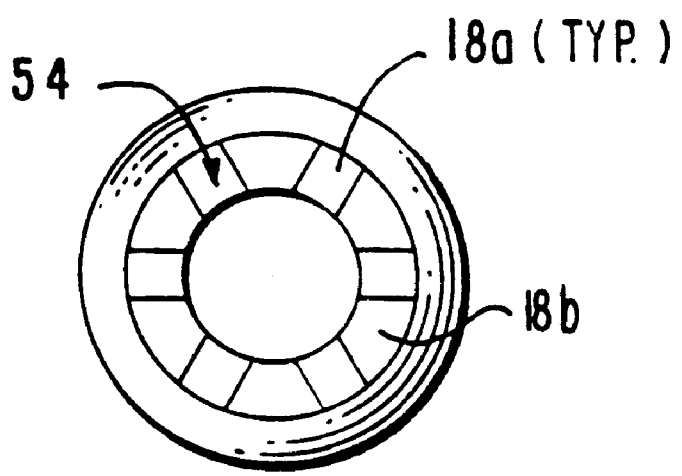
FIG. 4 is a plan view of the bottom surface of the preferred fuel inlet connector shown in FIGS. 1 and 2.

In addition, as shown in FIG. 4, radial slots in the form recessed surfaces 18a are provided in the lowermost surface of inlet connector 18 to reduce the effective contact surface area between the armature and the inlet connector by about one-third of the total cross-sectional area which was utilized in prior art conventional injectors. This configuration provides six coined pads 18b of about 0.005 mm in height, thus creating six corresponding rectangular shaped radial slots 18a to provide fuel flow paths. By reducing, the effective surface area of the lowermost face of the inlet connector 18 as shown, the tendency to develop an attractive force between the inlet connector 18 and the armature 14 is significantly reduced to about one-third of its original valve, and the ability to tolerate fuel contaminants at the interface without producing an attractive force therebetween is also significantly increased. As noted, preferably, the rectangular radial slots 18a are of a shallow depth, i.e. about 0.05 mm, (i.e., millimeters) in order to provide the benefit of reducing the inlet connector/armature interface surface area while still providing a relatively unobtrusive location for collection of solid contaminants which are ultimately removed by the flow of gaseous CNG.

As noted, the provision of recessed surfaces 18a in the lowermost surface of inlet connector 18 creates raised pads 18b on the surface, which pads improve the tolerance of the injector to fuel contaminants in several ways. The recessed surfaces 18a may be made by any suitable process, but are preferably coined. The first effect is to reduce the contact area of the inlet connector at the armature interface, thereby significantly reducing any attractive force generated therebetween by liquid contaminants such as oil or water. Furthermore, as noted, the radial pads 18b provide hidden areas between the pads where contaminants can collect without affecting the operative working gap 15 until being drawn away by the fuel flow. The working gap for gasoline is about 0.08 mm to about 0.14 mm and about 0.3 mm for compressed natural gas. In addition, as noted, the provision of the six rectangular recessed portions in the form of slots 18a and six raised pads 18b, each having a generally trapezoidal shape, on the inlet connector, provide a unique fuel flow path past transversely through the working gap 15 as shown at 56 in FIG. 5 and allow for the control of the fuel flow around and through the armature by controlling the pressure losses.

Also, by controlling the sizes of the recessed surfaces 18a and raised pads 18b, and the various apertures 58, 60, 66 in the armature and the valve body as will be described—as well as the numbers and combinations of such openings—the fuel flow can be controlled over at least three flow paths and pressure losses can also be controlled. For example, a small pressure differential across the armature while fully open, assists spring 30 during breakaway upon closing the provides dampening on opening impact. The additional fuel flow path also reduces the possibility of contaminants collecting above upper guide 36 as shown in FIG. 2. In summary, numerous combinations of apertures and sizes thereof—as well as slots and pads on the fuel inlet connector—can be made to direct the gaseous fuel flow in any desired manner which is best for optimum fuel burning and engine application.

Referring now to FIGS. 5 and 6 in conjunction with FIGS. 1–3, there is illustrated still another significant improvement which renders the present fuel injector assembly more fully capable of operation with CNG. In injectors which were used with relatively contaminant free liquid fuels the fuel would pass through the filter down through the inlet connector into the armature and out an opening positioned relatively close to the lowest portion of the armature which was located substantially immediately above the valve aperture. In the present structure there is provided a relatively diagonally oriented aperture 58 in the armature as shown in FIG. 5, which directs the CNG flow therethrough and downwardly toward valve aperture 41 for entry into the intake manifold of the internal combustion engine.

As shown in FIG. 5, aperture 58 forms a generally acute angle with longitudinal axis A—A of the fuel injector 10. In addition, the armature of the present invention provides at least one side opening 60 which is generally transverse to the longitudinal axis A—A, to permit fuel flowing downwardly through the center of the armature to be directed sidewardly out of the armature and thereafter downwardly toward the valve aperture 41 shown in FIG. 1. In the embodiment shown in FIG. 1, aperture 60 is generally horizontal, but may be oriented at an acute angle to the longitudinal axis if desired. Aperture 58 is not shown in the cross-sectional view of armature 14 in FIG. 1. The fuel flowing through aperture 60 is indicated by the flow lines 62 and the fuel flowing through aperture 58 is indicated schematically by flow lines 64. Optionally several additional horizontal apertures 60 may be provided in the armature at different radial locations thereabout, or alternatively as shown, one aperture 60 may be provided, depending upon the fuel flow pattern sought in each particular instance. It can be seen that the fuel flow from the fuel inlet connector 18 is divided into three paths, a first path expanding across working gap 15, a second path through aperture(s) 60, and a third path through aperture(s) 58. The first path extends between the armature 14 and the magnetic coil 28 and is ultimately joined by the second flow path passing through aperture(s) 60.

It can also be readily appreciated that the diameters of each aperture 58, 60 can be varied to direct the fuel flow in any predetermined desired direction. For example, by reducing the size of apertures 58, 60 fuel will be encouraged to flow with increased volume cross the working gap 15. Alternatively, increasing the diameter of apertures 58, 60 will attract greater volume of fuel through those apertures and thereby reduce the fuel flow across the working gap. It has also been found that the diameters of the apertures 58, 60 and the numbers and locations of such apertures affect the dampening characteristics of the valve needle 16, both upon opening and upon closing. Accordingly, the diameter of fuel flow apertures 58, 60 and the numbers, locations, and orientations of such apertures will depend upon the desired volumetric flow characteristics and desired flow patterns in each instance; however, diameters within the range of 1–2 mm have been found to be preferable.

Referring now to FIG. 6, a valve body 34 is also provided with central fuel path opening 35 and several diagonally oriented fuel path apertures 66 which are intended to receive the CNG fuel flowing from the first and second flow paths from the working gap 15 and aperture(s) 60 along the sides of the armature 14 and to redirect the fuel downwardly toward the valve aperture 41. When the needle 16 is lifted, the fuel is permitted to enter aperture 41 and thereafter directed into the intake manifold of the engine, which is not shown in the drawings. Fuel flowing along the third flow path through aperture(s) 58 lead directly toward aperture 41. It has been found that the unique provisions of the apertures 58 and 60—as well as rectangular radial slots 18a on the inlet connector lowermost face—create a fuel flow pattern which induces the CNG to flow in the manner shown by the fuel flow lines at 56 61 and 64 in FIG. 5 and such fuel flow lines actually create ideal pressure conditions to avoid causing the armature to be attracted to the inlet connector. Thus the attractive forces between the armature and inlet connector are minimized by the several factors mentioned, namely the elimination of the tendency of the oil and contaminates to accumulate in the space 15 located between the armature and the inlet connector, the reduction of the effective inlet connector/armature interface area by provision of radial pads on the face of the inlet connector, and the unique CNG flow patter which creates a force free environment between the inlet connector and the armature.

As indicated, alternatively, apertures 60 may be provided in several locations about the circumference of the armature, and apertures 58 may be provided in several locations thereabout. Also their angular orientations may be varied. However, it has been found that a single aperture on each side, as shown is sufficient to produce the desired flow path and the force free environment. Also, as noted, it should be noted that the diameter of each aperture can be altered in order to provide control of the fuel pressures and flow patterns in the areas surrounding the inlet connector, the armature, and the valve body, so as to provide a predetermined fuel flow pattern throughout the injector as may be desired. This feature is more fully disclosed in the aforementioned commonly assigned, copending application entitled Compressed Natural Gas Injector Having Gaseous Damping For Armature Needle Assembly During Opening.

It should also be noted that the presence of the diagonally oriented fuel flow apertures 66 in valve body 34 eliminates the problems of prior art injectors wherein debris and contaminants would accumulate in the area of the upper valve guide 36, causing abrasive action and intermittent guidance between the upper guide 36 and the armature 14. Thus, the provision of the diagonally oriented apertures 66 in valve body 34 encourage the flow of CNG past the area surrounding the upper guide 36 and eliminate any accumulation tendencies for contaminants in the area of upper guide 36.

Figure 7:
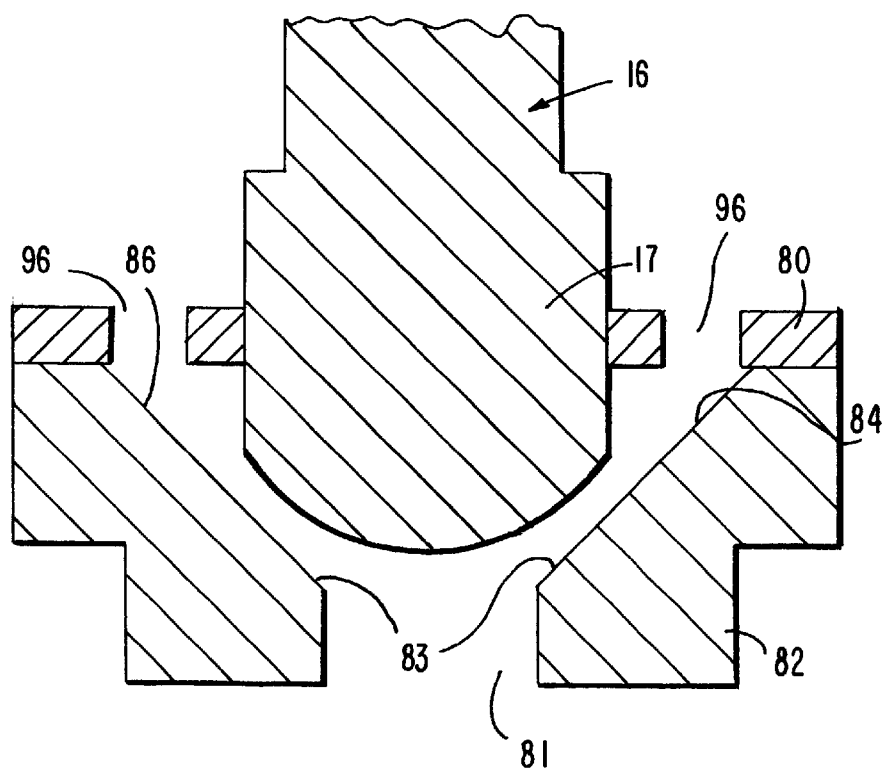
FIG. 7 is an enlarged cross-sectional view of a valve needle seat of the type presently used in such injectors, the valve needle being shown in a "valve open" position.
Figure 8:
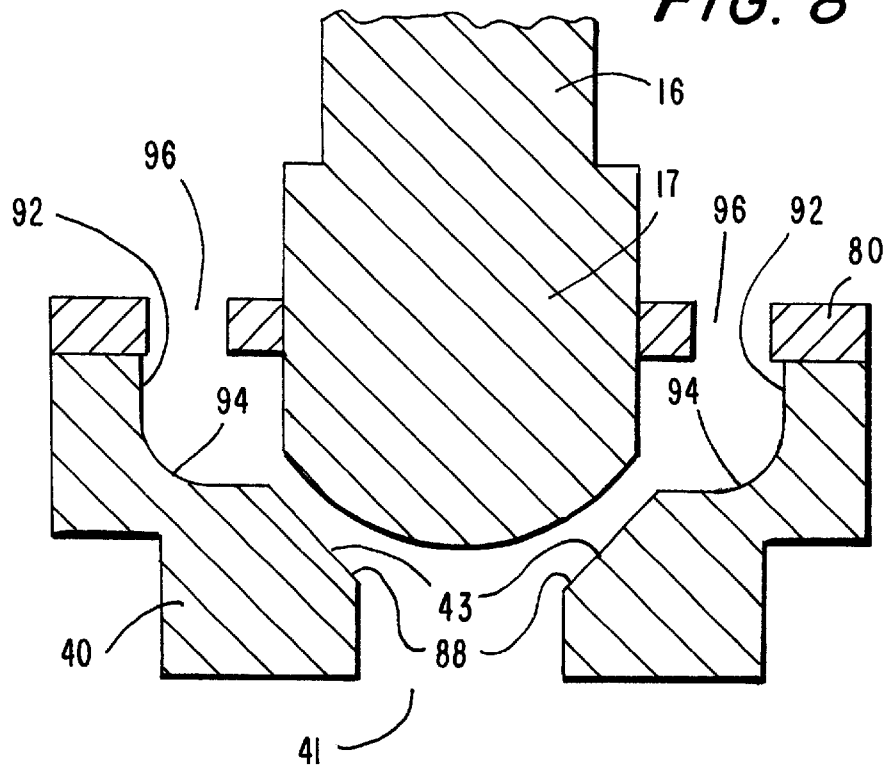
FIG. 8 is an enlarged cross-sectional view of an improved valve needle seat constructed according to the present invention and as shown in the injector in FIGS. 1 and 2, the valve needle being shown in a "valve open" position.

Referring now to FIGS. 7 and 8 there is shown a comparison between the valve needle seat of the type used in earlier developments, and the low restriction valve needle seat constructed according to the present invention.

Figure 9:
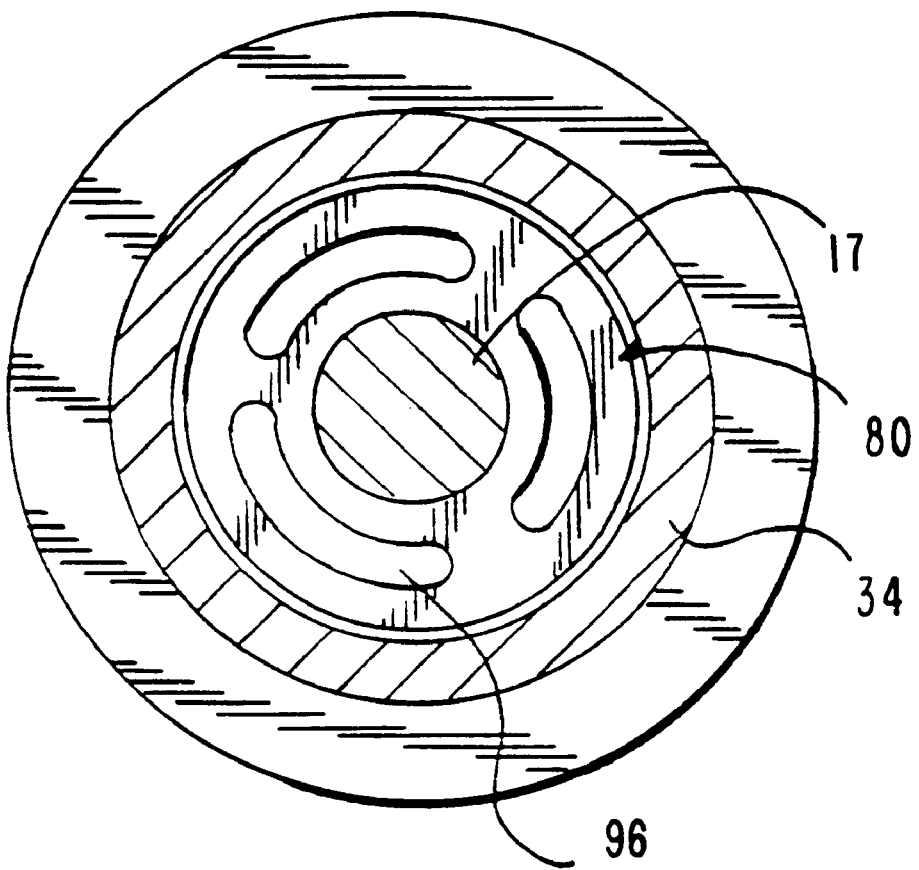
FIG. 9 is view taken along lines 9—9 of FIG. 2, illustrating a preferred valve needle lower guide having arcuately shaped fuel passage openings.

In FIG. 7, there is illustrated a tip portion 17 of a valve needle 16 of the type shown in FIGS. 1 and 2, in combination with a valve needle seat 82 of the type used in earlier developments. Lower needle guide 80 is shown in cross-section in combination with the tip portion 17 of needle 16, and is also shown in FIG. 9. As can be seen, the valve needle seat 82 has a frusto-conically shaped needle rest, all sides of which form an angle of approximately 90°, and a valve orifice 81 which, together with the needle rest surfaces 84, 86 form a funnel like arrangement through which the gaseous fuel must pass. Although needle rest surfaces 85, 86 actually form part of the same frust-conical surface, they are referred to separately for convenience of the description.

In contrast to the valve needle seat shown in FIG. 7, the valve needle seat 40 constructed according to the present invention is shown in FIG. 8. Referring to FIG. 8, it can be seen that the valve needle seat 40 includes frusto-conical valve needle seat surface 88, which is continuous and which forms an angle of approximately 90° in cross-section. However, valve needle seat 40 also includes an arcuate circular annular groove 92 having an arcuate surface 94 as shown, which connects the vertical surface and the horizontal surface of the groove 92 as shown. The function and purpose of groove 92 will best be appreciated by referring to FIG. 9, which illustrates a plan view of lower valve needle guide 80.

Referring now to FIG. 9, lower valve needle guide 80 includes arcuate apertures 96 which permit the flow of gaseous fuel therethrough for passage through valve aperture 41. Although arcuate apertures 96 are relatively large, the lower valve needle guide nevertheless tends to present a restriction to the passage of gaseous fuel thereby. Accordingly, in the structure shown in FIG. 7, as the needle 16 moves downwardly toward the valve seat 82 to pinch the flow at the contact points 43, immediately prior to actual contact, the pressure differential across the contact points 43 is substantial in that the pressure between the lower valve guide and the contact points 43 is substantially greater than the pressure on the opposite side of the contact points 43 just prior to contact being completed. In fact, the presence of the lower needle guide 80 tends to increase the pressure in the zone immediately above the contact points 43. Although "contact points 43" are referred to as "points," they each in fact are points on the same circle formed by the points of tangency between the arcuate needle contact surface and the needle rest surface. However, they are referred to separately for convenience of the description.

In contrast thereto, as shown in FIG. 8, the presence of the annular groove 92 which is provided in the needle valve seat tends to reduce the differential pressure across the seal points 43 by providing additional volumetric space between the lower needle guide 80 and the valve seat 40. Thus, the pressure differential across the seal points 43 is somewhat reduced thereby reducing the flow reducing pressure losses otherwise occurring across the point of contact between the needle 16 and the valve seat 40. Since such pressure losses tend to reduce the fuel flow passing through the injector, the provision of the unique valve seat 40 as shown in FIG. 8 has been found to avoid such reduction in fuel flow which occurs normally as a result of such pressure losses. This factor increases the energy flow into the engine with correspondingly increased efficiency.

Although the invention has been described in detail with reference to the illustrated preferred embodiments, variations and modifications may be provided within the scope and spirit of the invention as described and as defined by the following claims.

What is claimed is:

1. An electromagnetically operable fuel injector for a gaseous fuel injection system of an internal combustion engine, said injector having a generally longitudinal axis, which comprises:

(a) a ferromagnetic core;

(b) a magnetic coil at least partially surrounding the ferromagnetic core; and (c) an armature magnetically coupled to said magnetic coil and being movably responsive to said magnetic coil, said armature actuating a valve closing element which interacts with a fixed valve seat of a fuel valve and being movable away from said fixed valve seat when said magnetic coil is excited, said fixed valve seat defining a central fuel opening and a generally annular groove adjacent said central fuel opening, said armature having a generally elongated shape and a generally central opening for axial reception and passage of gaseous fuel from a fuel inlet connector positioned adjacent thereto, said fuel inlet connector and said armature being adapted to permit a first flow path of gaseous fuel between armature and said magnetic coil as part of a path leading to said fuel valve, said fuel inlet connector is positioned above said armature and is spaced from said armature by a working gap, wherein said fuel inlet connector comprises an upper end portion adapted for reception of gaseous fuel from a fuel source, and a lower end portion for discharging gaseous fuel, said lower end portion having a lower surface which faces an upper surface of said armature, said lower surface of said fuel inlet connector having a plurality of radially extending raised pads defined thereon, said pads having recessed portions therebetween to permit fuel to flow therethrough and across said working gap defined between said fuel inlet connector and said armature.

2. The electromagnetically operable fuel injector according to claim 1, further comprising at least one first fuel flow aperture extending through a wall portion of said armature to define a second flow path of gaseous fuel as part of a path leading to said fuel valve.

3. The electromagnetically operable fuel injector according to claim 2, wherein said armature defines at least one second aperture in a wall portion thereof to define a third flow path of gaseous fuel as part of a path leading to said fuel valve.

4. The electromagnetically operable fuel injector according to claim 3, wherein said at least one second aperture is oriented at a generally acute angle with respect to the longitudinal axis.

5. The electromagnetically operable fuel injector according to claim 4, wherein said fuel inlet connector and said armature are spaced to define a working gap therebetween and are adapted to permit said first flow path of gaseous fuel within said working gap.

6. The electromagnetically operable fuel injector according to claim 5, further comprising a valve body positioned downstream of said armature and having at least one aperture in a wall portion thereof for reception of fuel from at least two of said flow paths of gaseous fuel from said armature and said fuel inlet connector.

7. The electromagnetically operable fuel injector according to claim 6, further comprising a valve body shell at least partially surrounding said armature and said valve body, said valve body shell defining a radial space with said armature for passage of said first flow path of gaseous fuel between said armature and said valve body shell.

8. The electromagnetically operable fuel injector according to claim 7, wherein said fuel inlet connector is positioned above said armature and is spaced from said armature by a working gap, said fuel inlet connector defining a through passage for directing fuel toward said armature and said fixed valve seat.

9. An electromagnetically operable fuel injector for a compressed natural gas fuel injection system of an internal combustion engine, said injector having a generally longitudinal axis, which comprises:
  (a) a ferromagnetic core;
  (b) a magnetic coil at least partially surrounding said ferromagnetic core;
  (c) an armature magnetically coupled to said magnetic coil and movably responsive to said magnetic coil, said armature having a first upper end face and a lower end portion;
  (d) a valve closing element connected to said lower end portion of said armature and interactive with a fuel valve having a fixed valve seat to selectively permit fuel to pass through said valve seat as said valve closing element is moved to a valve open position by said armature, said fixed valve seat having a generally frusto-conically shaped portion surrounded by an adjacent circular shaped annular groove to reduce the pressure differential occurring across the valve closing element and said fixed valve seat upon closing said fuel valve;
  (e) a fuel inlet connector extending in a generally longitudinal direction above said armature and defining a path for fuel to enter said inlet connector and to be directed toward said armature, said fuel inlet connector having a lowermost end portion having a lowermost surface spaced above said armature to define a working gap through which said armature is moveable; and
  (f) said armature having a fuel reception portion for receiving a fuel directed from said fuel inlet connector, said armature further defining a generally axial fuel passage, wherein at least a first fuel flow aperture extends through a wall portion of said armature for directing fuel from said fuel inlet connector through said generally axial fuel passage and into said aperture toward said fixed valve seat for entry into an air intake manifold of the engine, said fuel flow aperture being oriented generally transverse to said longitudinal axis, and wherein said armature further defines at least a second fuel flow aperture extending through a lower portion thereof and oriented at an acute angle with said longitudinal axis, and positioned for directing fuel therethrough toward said fixed valve seat.

10. The electromagnetically operable fuel injector according to claim 9, wherein said lowermost surface of said fuel inlet connector and said armature are adapted to permit gaseous fuel to flow across said working gap and between said armature and said magnetic coil whereby at least three fuel flow paths are permitted.

11. The electromagnetically operable fuel injector according to claim 10, wherein said lowermost end portion of said fuel inlet connector has a generally chamfered configuration along the lowermost outer surface thereof.

12. The electromagnetically operable fuel injector according to claim 11, wherein said generally chamfered portion of said fuel inlet connector has a generally arcuate cross-section.

13. The electromagnetically operable fuel injector according to claim 12, wherein said valve closing element is a valve needle adapted for selective engagement and disengagement with said fixed valve seat.

14. The electromagnetically operable fuel injector according to claim 13, wherein said valve needle is attached to said armature by crimped portions of said armature.

15. The electromagnetically operable fuel injector according to claim 14, wherein a fuel filter is positioned at an upper end portion of said fuel inlet connector for filtering fuel prior to reception by said fuel inlet connector.

16. The electromagnetically operable valve according to claim 15, wherein said fuel inlet connector includes a lower surface portion having a plurality of radially extending grooves defining a corresponding plurality of radially extending raised pads so as to reduce the effective surface area of said lower surface portion of said fuel inlet connector facing said armature to thereby permit the gaseous fuel to flow generally transversely in said working gap, said transverse fuel flow thereby preventing accumulation of contaminants in said working gap.

17. The electromagnetically operable fuel injector according to claim 16, wherein said generally radially extending pads have a generally trapezoidal shape.

18. An electromagnetically operable fuel injector for a gaseous fuel injection system of an internal combustion engine, said injector having a generally longitudinal axis, which comprises;
  (a) a ferromagnetic core;
  (b) a magnetic coil at least partially surrounding the ferromagnetic core;
  (c) an armature magnetically coupled to said magnetic coil and being movably responsive to said magnetic coil, said armature actuating a valve closing needle having a generally spherically shaped fuel sealing tip portion which interacts with a fuel valve having a fixed valve seat and being movable away from said fixed valve seat when said magnetic coil is excited, said fixed valve seat having a generally annular sealing surface having a generally frusto-conical cross-sectional shape for engaged reception of said generally spherically shaped needle tip portion, said generally annular sealing surface defining a central opening for passage of gaseous fuel to a fuel intake manifold, and a generally circular annular groove adjacent said sealing surface to provide increased volumetric space adjacent said fixed valve seat for reception of gaseous fuel to thereby reduce the pressure loss across said needle and said valve seat upon closure thereof, said armature having a generally elongated shape and a generally central opening for axial reception and passage of gaseous fuel from a fuel inlet connector positioned adjacent thereto; and (d) at least one first fuel flow aperture extending through a wall portion of said armature for reception of gaseous fuel flowing from said inlet connector and for directing the gaseous fuel to a valve body at least partially surrounding said armature, said valve body having a generally elongated central opening for reception of substantially all of the gaseous fuel from said armature, wherein at least a first fuel flow aperture extends through a wall portion of said armature for directing fuel from said fuel inlet connector through said generally axial fuel passage and into said aperture toward said fixed valve seat for entry into an air intake manifold of the engine, said fuel flow aperture being oriented generally transverse to said longitudinal axis, and wherein said armature further defines at least a second fuel flow aperture extending through a lower portion thereof and oriented at an acute angle with said longitudinal axis, and positioned for directing fuel therethrough toward said fixed valve seat.

19. An electromagnetically operable fuel injector for an internal combustion engine, said injector defining a generally longitudinal axis, which comprises:

a) an outer housing;

b) a fuel inlet connector positioned in the upper end portion of said outer housing, said fuel inlet connector having an uppermost end portion for reception of fuel therein and a lowermost end portion for discharge of fuel therefrom:

c) an armature positioned below said fuel inlet connector and defining a generally axial elongated central opening to receive fuel flow from said fuel inlet connector, said armature having an uppermost end portion positioned below said lowermost end portion of said fuel inlet connector to define a working gap, and a lowermost end portion having a valve closing element positioned thereon for interaction with a fuel valve to selectively permit fuel to flow through said valve aperture when said armature is selectively moved upwardly toward said fuel inlet connector, said fuel valve defining a fixed valve which surrounds a central fuel opening for passage of gaseous fuel, said fixed valve seat further being surrounded by a generally circular annular groove adjacent thereto for reception of gaseous fuel passing therethrough so as to reduce the gaseous pressure loss across said valve during closure thereof;

d) said fuel inlet connector having a lowermost end portion having a lowermost surface which faces said uppermost end portion of said fuel armature, said lowermost end portion of said fuel inlet connector having a plurality of radially extending grooves separated by a corresponding plurality of radially extending raised pads to reduce the effective contact surface area between said inlet connector and said armature and to permit fuel to flow from said fuel inlet connector across said working gap;

e) a magnetic coil system for moving said armature and said valve closing element away from said fixed valve seat and toward said fuel inlet connector when said magnetic coil system is energized so as to permit fuel to flow through said fixed valve seat;

f) a resilient device to bias said armature and said valve closing element to move toward said fixed valve seat when said magnetic coil system is deenergized;

g) at least one first aperture extending through a wall portion of said armature for receiving fuel flow from said fuel inlet connector and directing said fuel flow from said generally elongated central opening of said armature toward said fixed valve seat, said at least one aperture being generally transverse to the longitudinal axis; and h) at least one second aperture extending through a wall portion of said armature for receiving fuel flow from said fuel inlet connector and directing said fuel flow toward said fixed valve seat, said second aperture being oriented at a generally acute angle relative to the longitudinal axis for directing fuel from said generally central opening outwardly of said armature and downwardly toward said fixed valve seat.

20. The electromagnetically operable fuel injector according to claim 19, wherein said valve closing element is a generally elongated valve needle having a spherically shaped end portion and configured and adapted to engage a frusto-conically shaped fixed valve seat to close said valve, and movable therefrom to open said valve to permit fuel to pass therethrough toward the intake manifold of the internal combination engine.

21. The electromagnetically operable fuel injector according to claim 20, wherein said valve needle is connected to the lower end portion of said armature by crimped portions.

22. The electromagnetically operable fuel injector according to claim 21, wherein said resilient device is a coil spring in engagement at one end with said fuel inlet connector and at the other end with said armature to bias said armature downwardly toward said valve seat.

23. The electromagnetically operable fuel injector according to claim 22, wherein said armature includes at least two of said first apertures extending through wall portions thereof and generally transverse to the longitudinal axis for receiving fuel from said generally axial elongated central opening.

24. The electromagnetically operable fuel injector according to claim 23, wherein said armature defines a plurality of said first apertures for receiving fuel from said generally axial elongated central opening.

25. The electromagnetically operable fuel injector according to claim 24, wherein said armature defines at least a plurality of said second apertures, each said second apertures extending at a generally acute angle to the longitudinal axis to receive fuel from said generally central opening.

26. A method of directing gaseous fuel through an electromagnetically operable fuel injector fuel injector for a fuel system of an internal combustion engine, said injector having a generally longitudinal axis, and including a fuel inlet and portion and a fuel outlet end portion, a fuel inlet connector positioned at said fuel inlet end portion and having a fuel inlet end portion and a fuel outlet end portion, an armature positioned adjacent said fuel outlet end portion of said fuel inlet connector, said fuel inlet connector, said armature being spaced from said fuel inlet connector to define working gap to permit movement of said armature toward and away from said fuel inlet connector to selectively open and close a fuel valve by providing upward and downward movement of a valve closing element to selectively permit gaseous fuel to pass therethrough to an air intake manifold comprising:

a) directing the gaseous fuel to pass axially through said fuel inlet connector;

b) directing the gaseous fuel to pass from said fuel inlet connector to said generally elongated central opening of said armature in a axial direction toward said fuel valve; and c) providing a valve seat with an annular groove adjacent a sealing surface, the annular groove receiving fuel so as to reduce pressure losses across said fuel valve during closure thereof.

27. A method of directing gaseous fuel through air electromagnetically operable fuel injector for a fuel system of an internal combustion engine, said injector having a generally longitudinal axis, and including a fuel inlet end portion and a fuel outlet end portion, a fuel inlet connector positioned at said fuel inlet end portion and having a fuel inlet end portion and a fuel outlet end portion, and armature positioned adjacent said fuel outlet end portion of said fuel inlet connector and having a generally central elongated opening for reception of fuel from said fuel inlet connector, said armature being spaced from said inlet connector to define a working gap to permit movement of said armature toward and away from said fuel inlet connector to selectively open and close a fuel valve having a valve seat and a fuel passage aperture by providing upward and downward movement of a valve needle with respect to a needle/seat interface to permit gaseous fuel to pass through said aperture toward an intake manifold, comprising:

a) directing the gaseous fuel to pass axially through said fuel inlet connector;

b) directing the gaseous fuel to pass from said fuel inlet connector to said generally elongated central opening of said armature in an axial direction toward said fuel valve;

c) directing at least a portion of the fuel flow from said fuel inlet connector to said armature to flow generally transversely across said working gap;

d) diverting at least a portion of the flow of gaseous fuel passing through said armature to flow in a direction away from said axial direction; and e) providing a valve seat with an annular groove adjacent a sealing surface, the annular groove receiving fuel so as to reduce pressure losses across said fuel valve during closure thereof.

* * * * *